A. IVERSON, Jr.

Seed and Guano Drill.

No 100,898.

Patented March 15, 1870.

United States Patent Office.

ALFRED IVERSON, JR., OF MACON, GEORGIA.

Letters Patent No. 100,898, dated March 15, 1870.

IMPROVEMENT IN SEED AND GUANO-DRILL.

The Schedule referred to in these Letters Patent and making part of the same

*To all whom it may concern:*

Be it known that I, ALFRED IVERSON, Jr., of Macon, in the county of Bibb, and State of Georgia, have invented a new and improved Seed and Guano-Drill; and I do hereby declare that the following is a full, clear, and exact description of the same, reference being had to the accompanying drawings making a part of this specification, in which—

Figure 1:
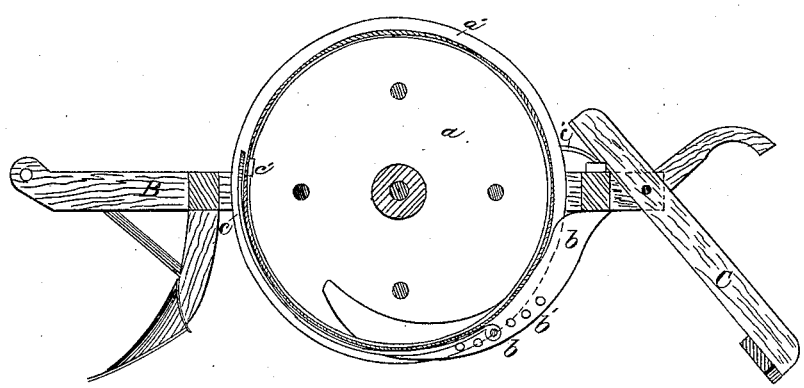
Figure 1 is a side elevation, with one side of the cylinder removed.
Figure 2:
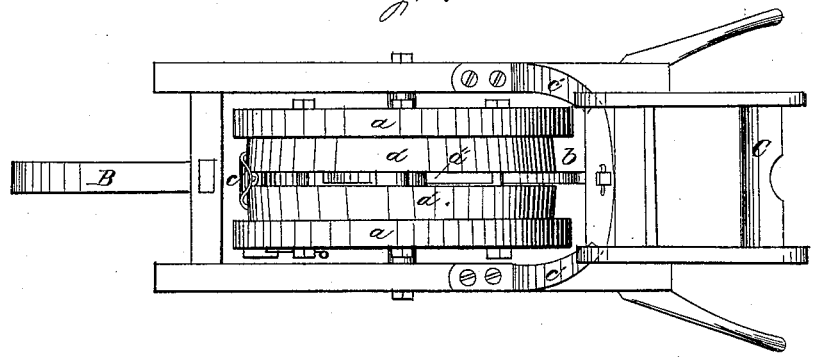
Figure 2 is a plan.

My invention relates to that class of seed and guano-drills in which a hollow slotted cylinder for holding the seed or guano is a main or distinguishing feature; and The invention consists in the combination with such cylinder of a stirrer, distributer, and coverer, under an arrangement hereinafter described.

In the drawings—

The cylinder is shown as formed with wooden side plates $a\ a$, of any desired size, bolted together, from the inner side of each of which projects an annular flange, $a'$, placed near the rim of the plate.

The space between the inner edges of the flanges $a'$ forms a circumferential slot, $a''$, through which the contents of the cylinder find exit.

B is the frame, in which the cylinder is placed.

To the rear cross-bar of the frame is secured the upper end of the finger $b$, the lower end of which projects through the slot $a''$ inside of the cylinder, and keeps the slot clear and the seed in the cylinder stirred.

In that part of the stirring-finger outside the cylinder is a row of transverse holes, $b'$, some of which are nearer the flanges $a'$ than others, and the forked end of the shield $c$ is secured by a bolt passing through either of the holes.

The upper extremity of the shield is held by a pin, $c'$, passing through the slot $a''$, the head of the pin bearing against the inside of the flanges $a'$.

The shield regulates the dropping of the seed or guano, and in proportion as the forked end of the shield is affixed to a hole nearer to or further from the flanges $a'$, the seed is dropped faster or slower.

C is a covering-frame, pivoted in the rear end of the frame B and controlled by springs $c\ c$, against which the upper end of the coverer is pressed by the contact of the lower end with the ground. This arrangement allows the coverer to yield to obstructions.

The forked end of the shield may be connected with the distributing-bar by spiral springs, and a chain may extend from its upper end to a hook at the right hand of the plowman, so that by taking up or letting out the links the sowing may be regulated.

Having thus described my invention,

What I claim as new, and desire to secure by Letters Patent, is—

The combination of slotted cylinder, fixed stirring-finger, adjustable distributer, and elastic coverer, all constructed and arranged substantially as and for the purpose described.

ALFRED IVERSON, JR.

Witnesses:
J. H. FULLEM,
J. S. SCHOFIELD.